Figure 1:
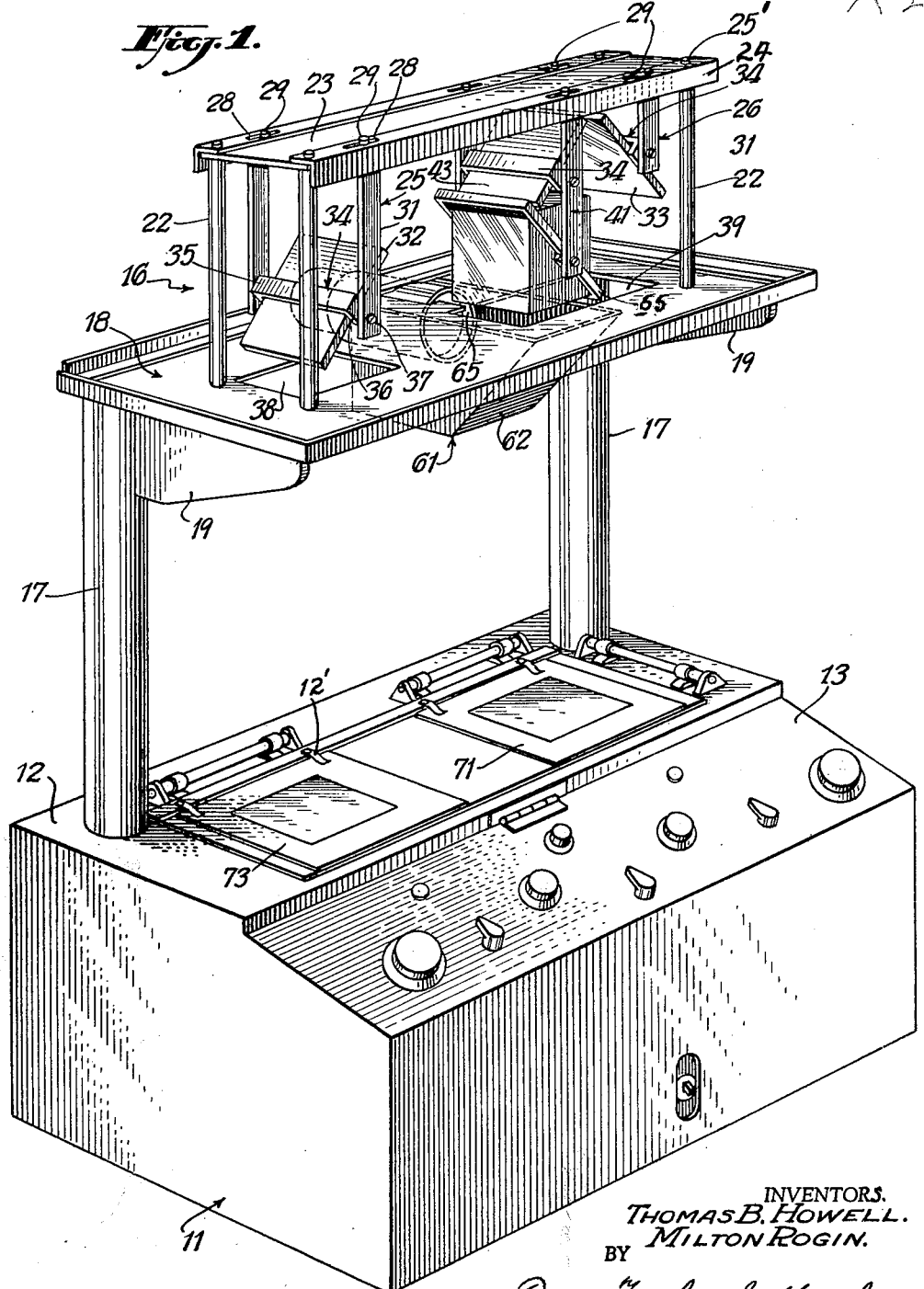

350-173

CROSS REFERENCE　　SEARCH ROOM

June 8, 1965　　T. B. HOWELL ETAL　　3,187,625
OPTICAL EQUIPMENT WITH PRISM ASSEMBLY FOR PROJECTING
A COMPOSITE IMAGE FROM TWO SEPARATE TRANSPARENCIES
Filed Oct. 31, 1961　　2 Sheets-Sheet 1

INVENTORS.
THOMAS B. HOWELL.
MILTON ROGIN.
BY
Dean, Fairbank & Hirsch
ATTORNEYS.

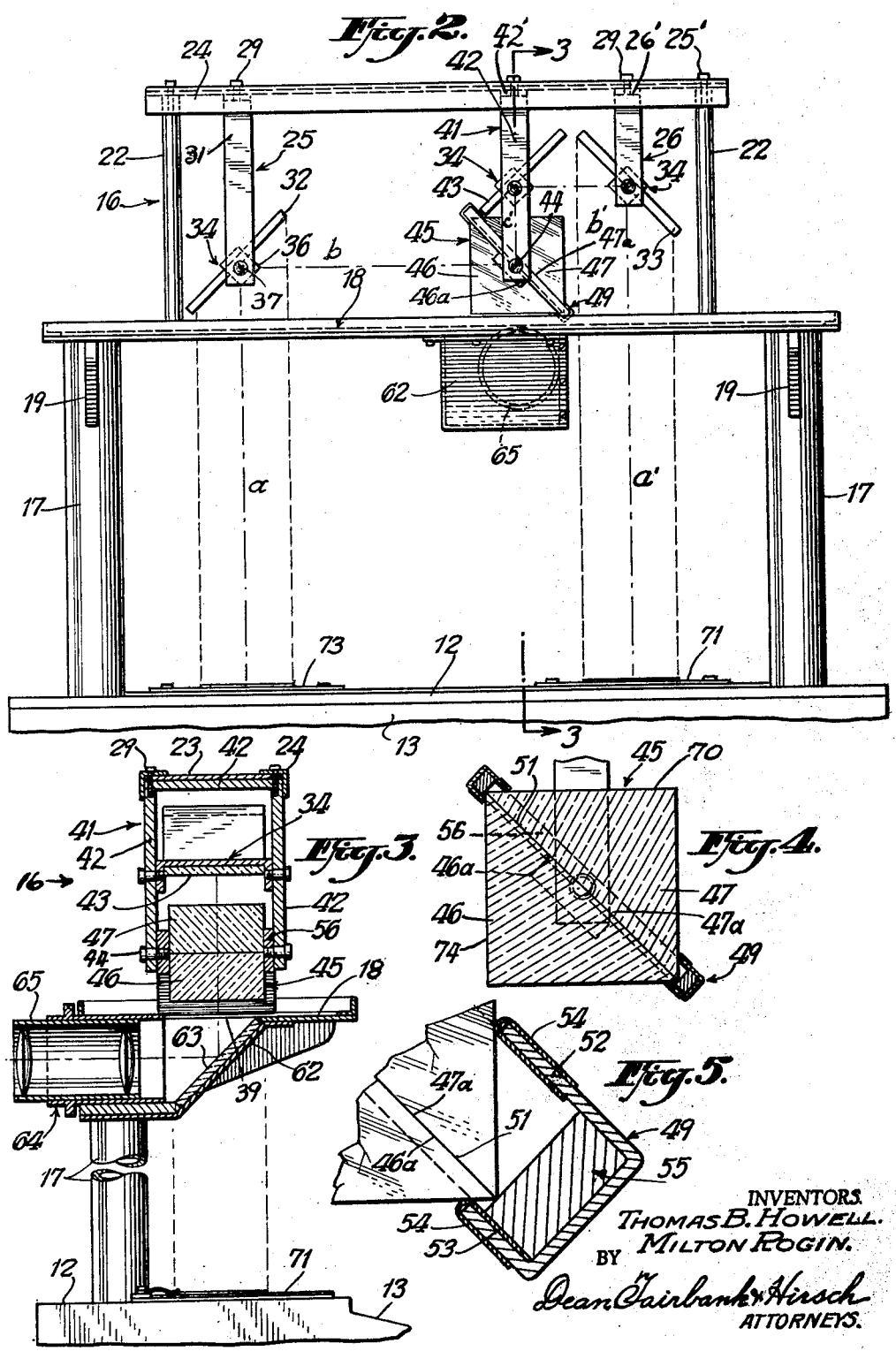

United States Patent Office

3,187,625
Patented June 8, 1965

3,187,625
OPTICAL EQUIPMENT WITH PRISM ASSEMBLY FOR PROJECTING A COMPOSITE IMAGE FROM TWO SEPARATE TRANSPARENCIES
Thomas B. Howell, 1815 Palmer Ave., Larchmont, N.Y., and Milton Rogin, 924 Woodmere Drive, North Woodmere, N.Y.
Filed Oct. 31, 1961, Ser. No. 149,075
11 Claims. (Cl. 88—24)

This invention relates to the art of projection equipment, more particularly of the type to provide a composite image for television transmission.

Where it is desired to project a composite image from two distinct transparencies onto the sensitive end of a television transmitting tube, such as an "Orthicon" tube, since the diameter of the sensitive end of such tube is relatively small, it is essential that the composite image be of such dimension as to completely fit onto such sensitive end. In addition, it is essential that the two elements or images from which the composite image is formed, be substantially perfectly aligned as otherwise the transmitted picture will not be sharply delineated.

According to the invention, the images from two separate and distinct transparencies mounted in side by side relationship are projected along substantially parallel lines, each against an inclined mirror. The images are reflected from such inclined mirrors through a prism system, which comprises a pair of prisms having their bases in juxtaposition, in such manner that one of the images will pass through the juxtaposed bases of the juxtaposed prisms in direction perpendicular to two opposed sides thereof and the other image pass through one of the prisms to be reflected by the base thereof at an angle of 45 degrees.

The images which form a composite image after passing through the prisms will strike an inclined mirror to be reflected by such mirror at an angle of 45 degrees through a projection lens that in turn will project the composite image onto the sensitive ends of the "Orthicon" television tube.

In the accompanying drawings in which is shown one of various possible embodiments of the several features of the invention, FIG. 1 is a perspective view of the equipment, FIG. 2 is a front elevational view of the projection head portion of the equipment, FIG. 3 is a sectional view taken along line 3—3 of FIG. 2, FIG. 4 is a detail sectional view on an enlarged scale of the prism assembly, and FIG. 5 is a detail view on an enlarged scale of the retaining frame for the juxtaposed prisms.

Referring now to the drawings, as shown in FIG. 1, the projection equipment desirably comprises a hollow housing 11 which defines the base of the equipment. The base 11 contains a pair of electric lamps and suitable lenses and mirrors to permit light from the lamp to be projected upwardly through appropriate iris controlled openings in the top wall 12 of the base, suitable clamps 12' being provided to retain a transparency 71, 73 over such openings. The projection lamps and irises may be controlled by suitable operating elements on the front panel 13 of the equipment. As the construction of the elements in the housing 11 may be of the general type shown in Patent No. 2,944,461, and forms no part of the present invention, they will not be further described.

According to the invention, a projection head 16 is mounted on the top wall 12 of the housing 11. As is clearly shown in FIG. 1, the projection head comprises a pair of upstanding posts or standards 17, secured at their lower ends in fixed position in the housing 11.

Mounted on the upper ends of the posts 17 is a horizontal supporting plate 18 which is desirably reinforced by means of brackets 19 secured to the undersurface of the plate 18 and to the posts 17.

Rising from the plate 11 near each of its ends is a pair of spaced parallel upright posts 22. Resting on the upper ends of said posts is an elongated rectangular strip 23 which is retained on the post by means of elongated L-shaped channel members 24 secured to the post as by screws 25'.

As shown in FIGS. 1 and 2, a pair of U-shaped brackets 25, 26 are suspended from strip 23 near each end thereof. The brackets are mounted so that the cross pieces 26' thereof extend transversely across the strip and are secured in such a manner that the spacing between the brackets may be adjusted. To this end, elongated longitudinal slots 28 are provided in the L-shaped channel members 24 and in the side edges of the strip 23 through which a screw 29 extends threaded into a correspondingly threaded opening at each end of the cross piece of the associated bracket. Thus, by loosening the screws the brackets may be moved to desired position and the screws are then tightened to hold the brackets in place.

The parallel legs 31 of each of the brackets support a substantially rectangular mirror 32 and 33 respectively, preferably of the front surface type. To this end, as shown in FIG. 1, a U-shaped bracket 34 is provided associated with each of the mirrors 32 and 33. The cross piece 35 of each of the brackets is secured to the rear surface of the mirror in any suitable manner and the legs 36 of the bracket straddle the mirror. The ends of the legs 36 of the bracket are pivotally connected to the ends of the legs of the associated bracket as by screws 37 which extend through openings in the legs 31 of brackets 25, 26 into threaded openings in the legs 36 of brackets 34 so that by loosening of the screw the angle of the mirrors may be adjusted and the screws are then tightened to retain the mirrors in position.

As is clearly shown in FIGS. 1 and 2, the legs 31 of bracket 25 are longer than those of bracket 26 so that the mirror 32 is positioned closer to the plate 18 than the mirror 33. As is also shown in FIG. 1, the plate 18 has a pair of spaced apertures 38 and 39 which are vertically aligned with the openings in the top wall 12 of the housing 11 for projection of light through the openings from the light projectors in the housing 11.

Also suspended from the strip 23 is an additional U-shaped bracket 41, the cross piece 42' of which is secured to the strip 23 and the channel members 24 in the same manner as the cross pieces of bracket 25 and 26 so that the position of bracket 41 along the length of the strip 23 may be adjusted.

The legs 42 of bracket 41 are substantially the same length as those of bracket 25 and an additional mirror 43, also of the front surface type is pivotally mounted on bracket 41 above the ends of the legs 42 thereof in the same manner as the mirrors 32 and 33 are mounted on their associated brackets.

Mounted at the lower ends of the legs 42 of bracket 41 is a prism assembly 45, which comprises two identical prisms 46 and 47 which, when their bases 46a and 47a are juxtaposed, will form a cube.

The bases 46a and 47a of said prisms are desirably bonded together by any suitable transparent adhesive or glue and a frame 55 is provided extending diagonally with respect to the cube defined by the prisms and encompassing the junction 51 between the bases 46a and 47a.

As is more clearly shown in FIGS. 1 and 5, the frame 55 comprises a rectangular member of greater length than width so that the side legs 56 of the frame may be positioned to extend diagonally across the sides of the cube defined by the juxtaposed prisms over the junction 51 of the bases thereof.

To hold the frame 55 in fixed position, a pair of retaining members 49 are provided each comprising a substantially U-shaped strip having one of its legs 52 of greater length than the other leg 53. The free edges of the legs of the retaining members 49 desirably have a covering strip 54 mounted thereon which may be of fabric or plastic as desired. Thus, the frame and associated retaining strip will retain the two prisms in juxtaposed relationship.

The legs 56 of the frame 55 extending along the side faces of the cube formed by the juxtaposed prisms are positioned between the parallel legs 42 of the bracket 41 and by means of screws 44, extending through the ends of the brackets 42 into the opposed parallel legs 56, the prism may be securely, yet adjustably mounted between said bracket legs.

The opening 39 in the plate 18 also extends directly beneath the cube formed by the juxtaposed prisms and a projection housing 61 is secured to said plate 18 on the undersurface thereof and extends transversely thereacross. The projection housing 61 has an inclined front wall 62 on which is mounted a mirror 63 preferably of the front surface type which is aligned with the opening 39 in the plate 18 and the bottom surface of the prism 46. The projection housing 61 has a front wall through which extends a projection lens 64.

As shown in FIG. 3, the projection lens comprises a cylindrical sleeve 65 having suitable lenses at each end, the longitudinal axis of said sleeve and the lens being aligned with substantially the central portion of said mirror 63 as is clearly shown in FIG. 3. The sleeve 65 carrying the lenses is so mounted that its longitudinal position, i.e., the distance thereof from the mirror 63 may be adjusted to focus the image projected therethrough in the manner hereinafter described.

In setting up the equipment the mirrors 32 and 33 are adjusted so that they are inclined toward each other with their front surfaces forming an angle of 45 degrees with respect to a line extending upwardly at right angles to the top wall 12 of the housing 11. The mirror 43 is inclined toward and faces the mirror 33 also to form an angle of 45 degrees so that the light reflected from the mirror 33 onto mirror 43 will be reflected downwardly by mirror 43 in direction parallel to the direction of the light projected onto the mirror 33 and at right angles to the top surface of prism 47.

In setting up the equipment, the distance from the top 12 of the housing 11 to the mirror 32 indicated by the letter "$a$" plus the distance from the mirror 32 to the base 46a of the prism 46 indicated by the letter "$b$" will be equal to the distance from the top 12 of housing 11 to the mirror 33 indicated by the letter "$a'$" plus the distance from mirror 33 to mirror 43 indicated by the letter "$b'$" and the distance from the mirror 43 to base 47a of the prism 47 indicated by the letter "$c$."

Since the top wall 12 of housing 11 is in a horizontal plane and the mirrors 33 and 43 and the base 47a of prism 47 each is at an angle of 45 degrees, the image from transparency 71 over the associated opening in the top wall 12 of housing 11 will be reflected downwardly from mirror 43 along a line perpendicular to the horizontal top surface 70 of prism 47 and hence pass directly through the juxtaposed prisms 46 and 47 onto the front surface mirror 63 which is also inclined at an angle of 45 degrees. The light projected through the transparency 73 over the associated opening in the top wall 12 of housing 11 will be reflected by inclined mirror 32 in direction parallel to the top wall of the housing 11 so that it will pass through the prism 46 at right angles to the side wall 74 thereof and strike the inclined base 46a of said prism, which is also at an angle of 45 degrees and be deflected vertically downwardly onto the inclined mirror 63.

As a result of the fact that the distance that the image of each of the transparencies must travel before it reaches the inclined mirror 63, is identical and also as a result of having the mirrors 32, 33, 43 and the bases 46a, 47a of the prisms 46, 47 as well as the mirror 63, all at 45 degree angles, the two images from the transparencies 71 and 73 will be substantially exactly aligned when projected onto the inclined mirror 63. This mirror will reflect such composite aligned image into the lens system 64 which in turn will project such composite image onto the sensitive end of a conventional television projection tube such as an "Orthicon" tube.

It is of course apparent that by changing the focal length of the lens system 54 that projects the composite image from mirror 63, the size of the projected image can be varied.

As many changes could be made in the above equipment, and many apparently widely different embodiments of this invention could be made without departing from the scope of the claims, it is intended that all matter contained in the above description or shown in the accompanying drawings shall be interpreted as illustrative and not in a limiting sense.

Having thus described our invention, what we claim as new and desire to secure by Letters Patent of the United States is:

1. A composite optical image projection equipment comprising a base having a top wall with a pair of spaced openings, means in said base to project light through said openings, means to mount a transparency on said top wall over each of the openings therein respectively, a projection head over said base, said projection head comprising a pair of mirrors inclined toward each other, each mirror being in the path of the light projected through the associated transparency, a second inclined mirror facing one of said pair of mirrors, a prism assembly in the path of the light reflected from the other mirror of said pair and from said second mirror through which the reflected light passes to provide a composite optical image.

2. The combination set forth in claim 1 in which an additional inclined mirror is positioned in the path of the light through said prism assembly.

3. The combination set forth in claim 1 in which a projection lens is positioned in the path of light through said prism assembly.

4. The combination set forth in claim 1 in which an additional inclined mirror is positioned in the path of the light through said prism assembly and a projection lens is provided in the path of light reflected by said additional mirror.

5. The combination set forth in claim 1 in which said prism assembly comprises a pair of identical prisms having their bases in juxtaposition, said prism assembly being positioned so that the light reflected from said second mirror will pass through both of said juxtaposed prisms and the bases thereof in direction perpendicular to the top surface of one of said prisms and the light reflected from the other of said pair of prisms will pass through the side surface of the other prism and be reflected from the base thereof, the light from both mirrors passing through the bottom surface of the other prism.

6. The combination set forth in claim 5 in which the length of the paths of light from both transparencies to the bases of said prisms is identical.

7. The combination set forth in claim 5 in which said juxtaposed prisms form a square in cross section with the juxtaposed bases of said prisms forming the diagonal of said square.

8. The combination set forth in claim 5 in which said juxtaposed prisms form a square in cross section with the juxtaposed bases of said prisms forming the diagonal of said square, and a rectangular frame extends around said juxtaposed prisms over the junction defined by said juxtaposed bases.

9. The combination set forth in claim 5 in which each of said mirrors is inclined at an angle of 45 degrees and the junction between the juxtaposed bases of said prisms is at an angle of 45 degrees.

10. Projection equipment for projecting a composite optical image, said equipment comprising in combination a base having a top wall with a pair of spaced openings, means in said base to project light through the openings, means to mount a transparency on said top wall over each of the openings, a projection head over said base, a strip on said head extending in a plane parallel to the top wall of said base, a first mirror supporting bracket secured to said strip, a mirror supported by said bracket at a given distance fom said strip, said mirror having a reflecting surface inclined at an angle of 45 degrees to the top wall of said base and arranged in the path of the light projected from one of said spaced openings, a second mirror supporting bracket secured to said strip, a second mirror supported by said second bracket at a distance closer to said strip than said given distance between said first named mirror and said strip, said second mirror having a reflecting surface inclined toward said first named mirror at an angle of 45 degrees to the top wall of said base and arranged in the path of the light projected from a second of the spaced openings, an intermediate bracket on said strip between said first and second mirror supporting brackets, a third mirror supported by said intermediate bracket inclined toward said second mirror at an angle of 45 degrees to the top wall of said base, a two prism assembly supported by said intermediate bracket so that a horizontal surface of said assembly is perpendicular to the path of light reflected from said third mirror and the plane of juxtaposition of said prisms is in the path of light reflected from said first named mirror, whereby the light passing from the first of said pair of openings will be mixed with the light from the other of said openings to permit projection of a composite image.

11. Projection equipment as in claim 10 in which said two prism assembly comprises a pair of triangular prisms each having two parallel walls, two perpendicular walls between said parallel walls, and a wall between said perpendicular and parallel walls at 45 degrees to said perpendicular walls, said prisms juxtaposed at said last named 45 degree wall, and a frame extending about said prisms bounding the plane of juncture of said 45 degree wall.

References Cited by the Examiner
UNITED STATES PATENTS

| | | | |
|---|---|---|---|
| 2,352,176 | 6/44 | Bogopolsky | 95—18 |
| 2,665,335 | 1/54 | Cahen | 88—16.6 |
| 2,754,722 | 7/56 | Howell et al. | 88—24 |

FOREIGN PATENTS

| | | |
|---|---|---|
| 498,167 | 10/19 | France. |

NORTON ANSHER, *Primary Examiner.*

EMIL G. ANDERSON, *Examiner.*